J. A. BAUCOM.
MOTOR VEHICLE STEERING GEAR.
APPLICATION FILED NOV. 27, 1914.
1,136,503.
Patented Apr. 20, 1915.
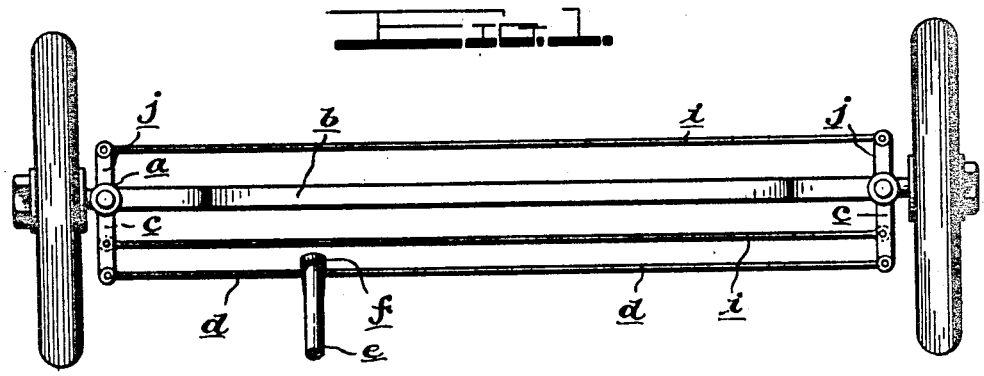
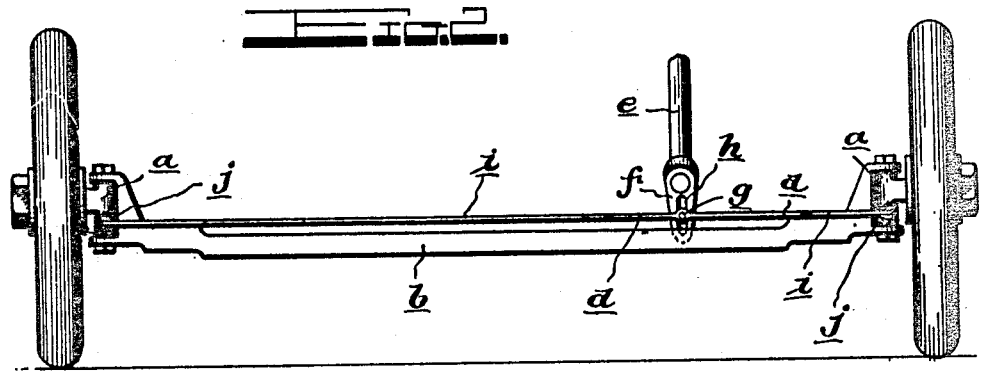
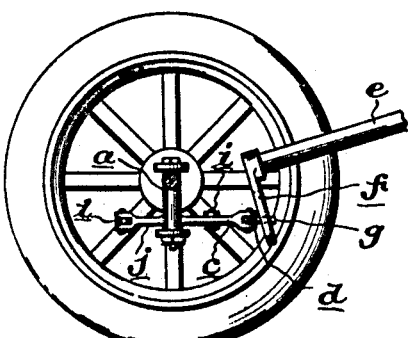
Witnesses
Inventor
Jesse Atlas Baucom
By Davis & Davis
Attorneys

UNITED STATES PATENT OFFICE.

JESSE ATLAS BAUCOM, OF RAEFORD, NORTH CAROLINA.

MOTOR-VEHICLE STEERING-GEAR.

1,136,503.   Specification of Letters Patent.   Patented Apr. 20, 1915.

Application filed November 27, 1914. Serial No. 874,226.

*To all whom it may concern:*

Be it known that I, JESSE ATLAS BAUCOM, a citizen of the United States of America, and a resident of Raeford, county of Hoke, State of North Carolina, have invented certain new and useful Improvements in Motor-Vehicle Steering-Gears, of which the following is a full and clear specification, reference being had to the accompanying drawings, in which—

Figure 1 is a plan view of a steering gear embodying one form of my invention; Fig. 2 a front elevation thereof; Fig. 3 a vertical transverse sectional view.

The object of this invention is to provide the steering gear of a motor vehicle with means for insuring the operativeness of the wheel-shifting devices should the usual parts of the gear become inoperative, whereby all those accidents which occur by reason of derangement in the shifting rods, etc., are avoided, as more fully hereinafter set forth.

The wheels of the vehicle are journaled on the spindles of the usual steering knuckles $a$, each of which is mounted on a vertical pivot as usual, the pivot being supported on the ends of the axle $b$. The usual rearwardly extending arm $c$ is attached to each knuckle and the rear ends of these arms are connected by means of rods $d$ to a suitable means for shifting the rods from the steering wheel. In the present instance, I illustrate a shaft $e$ which may be connected to the steering post in any suitable manner and which is provided with a depending arm or crank $f$ provided with a slot $h$ in which works a pin $g$ attached to the meeting ends of the rods $d$. I have shown these rods in the present instance as integral, but it will be understood that they may be in separate parts. The arms $c$ are also connected together by a rod $i$ which is parallel with the axle, and I also connect the spindle knuckles by still another rod $i$ arranged in front of the axle, this latter rod being pivotally connected at its ends to forwardly extending arms $j$ carried by the respective knuckles. It will be observed that by rotating shaft $e$ in the appropriate direction, the wheels may be shifted to steer the vehicle in the usual manner. The rearwardly extending arms $c$, the rear rod $i$ and one of the rods $d$ may be said to constitute the usual common form of steering means, and the remaining rod $d$ together with the front rod $i$ and the arms $j$ may be said to be supplemental parts which, in combination with said usual members, constitute my invention. It will be observed that with my arrangement of parts it will be practically out of the question to put the steering gear out of commission by reason of derangement of any of the operating parts. The breaking of one of the rods $d$ will still leave the apparatus operative, and, even should one of the rods $i$ also be broken, the knuckles could still be shifted as usual. Nor would the destruction of both the rods $i$ put the apparatus out of commission if the two rods $d$ remain intact. It will therefore be seen that in my apparatus I provide a steering mechanism which only under very remote conditions will become inoperative. It will be observed that my invention is not confined to the details of construction shown and described. Any suitable means may be provided for laterally shifting the rods $d$ simultaneously.

It will be seen that a feature of my invention is arranging the pivots in each of the pairs of arms in alinement, the line of one series of pivots being parallel with the line of the other pivots at the other side of the vehicle, whereby the rods and the arms will in all adjustments form a parallelogram.

Having thus described my invention, what I claim is:

In combination with an axle, steering knuckles and wheels, each of said knuckles being provided with a forwardly-extending arm and also with a rearwardly-extending arm, a pair of rods arranged parallel with the axle and having their ends pivotally connected to the respective arms, one of these rods being arranged in front of the axle and the other in the rear thereof, additional rods pivotally connected to the rearwardly extending arms at points to the rear of said parallel rods, these additional rods being parallel with the aforesaid rods, and means connected to these additional rods to shift them in unison endwisely in a direction transversely of the vehicle, for the purpose set forth.

In testimony whereof I hereunto affix my signature in the presence of two witnesses.

JESSE ATLAS BAUCOM.

Witnesses:
J. N. STEELE,
JNO. W. MOORE.

Copies of this patent may be obtained for five cents each, by addressing the "Commissioner of Patents, Washington, D. C."